United States Patent
Yamada

(10) Patent No.: US 8,682,469 B2
(45) Date of Patent: Mar. 25, 2014

(54) PROCESSING DEVICE AND PROCESSING METHOD

(75) Inventor: Takeshi Yamada, Aichi-ken (JP)

(73) Assignee: Mitsubishi Heavy Industries, Ltd., Tokyo (JP)

(*) Notice: Subject to any disclaimer, the term of this patent is extended or adjusted under 35 U.S.C. 154(b) by 388 days.

(21) Appl. No.: 13/201,677

(22) PCT Filed: Jan. 29, 2010

(86) PCT No.: PCT/JP2010/051206
§ 371 (c)(1),
(2), (4) Date: Aug. 16, 2011

(87) PCT Pub. No.: WO2010/098169
PCT Pub. Date: Sep. 2, 2010

(65) Prior Publication Data
US 2011/0301743 A1    Dec. 8, 2011

(30) Foreign Application Priority Data
Feb. 27, 2009  (JP) ................. 2009-045253

(51) Int. Cl.
G06F 19/00    (2011.01)
(52) U.S. Cl.
USPC ............... 700/190; 348/136; 382/224
(58) Field of Classification Search
USPC ............... 700/190; 348/136; 382/224
See application file for complete search history.

(56) References Cited

U.S. PATENT DOCUMENTS

| | | | | |
|---|---|---|---|---|
| 4,920,273 A | * | 4/1990 | Sacks et al. | 250/559.08 |
| 2003/0230941 A1 | * | 12/2003 | Jacobs | 310/12 |
| 2005/0046584 A1 | * | 3/2005 | Breed | 340/825.72 |
| 2005/0087691 A1 | * | 4/2005 | Cochran et al. | 250/341.1 |

(Continued)

FOREIGN PATENT DOCUMENTS

| | | |
|---|---|---|
| JP | 6-102918 | 4/1994 |
| JP | 11-123634 | 5/1999 |

(Continued)

OTHER PUBLICATIONS

International Search Report issued Apr. 27, 2010 in International (PCT) Application No. PCT/JP2010/051206.

*Primary Examiner* — Mohammad Ali
*Assistant Examiner* — Anthony Whittington
(74) *Attorney, Agent, or Firm* — Wenderoth, Lind & Ponack, L.L.P.

(57) ABSTRACT

A first servomotor drives a first portion in a moving radius rotational direction. A second portion is supported by the first portion such that the second portion is movable in a moving radius direction. A second servomotor drives the second portion in the moving radius direction. The second portion supports a tool for processing a work. A control device generates measurement data indicating relationships between coordinates in the moving radius rotational direction of a plurality of points on a reference surface of the work and distances from the plurality of points to a distance sensor based on a distance signal from the distance sensor, determines a coordinate range in the moving radius rotational direction of a step formed on the reference surface based on the measurement data, generates control data indicating a locus of the tool based on the measurement data and the step coordinate range, and numerically controls the first and second servomotors based on the control data. The control device selectively uses a plurality of offset values based on the coordinate range of the step when generating the control data.

16 Claims, 12 Drawing Sheets

(56) References Cited

U.S. PATENT DOCUMENTS

2008/0036580 A1* 2/2008 Breed ............................ 340/438
2008/0142713 A1* 6/2008 Breed et al. .................... 250/330
2008/0144944 A1* 6/2008 Breed ............................ 382/224
2008/0168673 A1* 7/2008 Herchen et al. ................. 33/550
2008/0236275 A1* 10/2008 Breed et al. .................. 73/290 V

FOREIGN PATENT DOCUMENTS

| | | |
|---|---|---|
| JP | 2000-33533 | 2/2000 |
| JP | 2001-150297 | 6/2001 |
| JP | 2003-241808 | 8/2003 |
| JP | 2005-342865 | 12/2005 |

* cited by examiner

Fig. 8

| θ | r |
|---|---|
| $\theta_0$ | $r_0$ |
| ⋮ | ⋮ |
| $\theta_k$ | $r_k$ |
| ⋮ | ⋮ |
| $\theta_n$ | $r_n$ |

| θ | Δr |
|---|---|
| $\theta_0$ | $\Delta r_0 (=r_1-r_0)$ |
| ⋮ | ⋮ |
| $\theta_k$ | $\Delta r_k (=r_{k+1}-r_k)$ |
| ⋮ | ⋮ |
| $\theta_{n-1}$ | $\Delta r_{n-1} (=r_n-r_{n-1})$ |

| $\theta$ | T |
|---|---|
| $\theta_0$ | $T_0(=R+r_0+D1)$ |
| ⋮ | ⋮ |
| $\theta_k$ | $T_k(=R+r_k+D1)$ |
| $\theta_{k+1}$ | $T_{k+1}(=R+r_{k+1}+D2)$ |
| $\theta_{k+2}$ | $T_{k+2}(=R+r_{k+2}+D2)$ |
| $\theta_{k+3}$ | $T_{k+3}(=R+r_{k+3}+D1)$ |
| ⋮ | ⋮ |
| $\theta_n$ | $T_n(=R+r_n+D1)$ |

PROCESSING DEVICE AND PROCESSING METHOD

TECHNICAL FIELD

The present invention relates to a processing device and a processing method for machining, in particular, to a processing device and a processing method for performing a process with high precision by setting a tool path based on a pre-process measurement.

BACKGROUND ART

After being formed into predetermined shapes, sheet metal parts and composite material parts of aircraft are subjected to a trimming to have exact dimensions specified in drawings. As a trimming method, there are known a method in which a special jig is used to provide a marking line on a part and a trimming is performed along the marking line, a method in which a tool is moved along a special guide jig fixed to a part so as to perform a trimming, and a method in which an NC (numerical control) processing device is used to perform a trimming. It is difficult to automate the method in which a trimming is performed along the marking line. In the method in which a tool is moved along a special guide jig fixed to a part so as to perform a trimming, a special jig is required for each part and an exact alignment is required in attaching the jig to the part. Also, in the method in which an NC processing device is used to perform a trimming, an exact alignment of a part is required.

Japanese Patent Publication (JP-P2005-342865A) discloses a processing device for performing a trimming by tracing a shape of apart. The processing device includes a tool for trimming a to-be-processed material and a guide jig. The guide jig includes a contacting portion and a holding portion attached to the contacting portion. The holding portion holds the tool. The contacting portion includes a contacting surface which contacts a reference surface extending in a longitudinal direction of the to-be-processed material and moves in the longitudinal direction with the contacting surface contacting the reference surface. The tool moves along a locus corresponding to a shape of the reference surface to form a trimmed shape on the to-be-processed material. According to the trimming by tracing a shape of a part, an exact alignment is not necessary.

However, since the shape of the reference surface is reflected in the trimmed shape as it is, when recesses and protrusions are provided to the reference surface, recesses and protrusions corresponding to those recesses and protrusions are provided to the trimmed shape. When the recesses and protrusions of the reference surface are necessary but the recesses and protrusions of the trimmed shape are unnecessary, such inflexibility of the trimming by tracing the shape of part will provide a problem.

Japanese Patent Publication (JP-A-Heisei 11-123634) discloses another processing device for performing a trimming by tracing a shape of apart. The processing device includes a processing tool unit, a numerical control unit, measuring means, and tool path deriving means. The measuring means are driven and controlled by the numerical control unit to measure a dimension distribution in a to-be-processed material. The tool path deriving means derives a tool path based on the measurement result by the measuring means. The numerical control unit moves the processing tool unit along the tool path.

CITATION LIST

Patent Literature

Patent literature 1: Japanese Patent Publication (JP-P2005-342865A)

Patent Literature 2: Japanese Patent Publication (JP-A-Heisei 11-123634)

SUMMARY OF INVENTION

An object of the present invention is to provide a processing device and a processing method capable of processing a work into a desired shape without requiring an exact alignment of the work.

In a first aspect of the present invention, a processing device includes: a first portion; a first servomotor configured to drive the first portion in a first direction; a distance sensor provided to the first portion; a second portion supported by the first portion such that the second portion is movable in a second direction orthogonal to the first direction; a second servomotor configured to drive the second portion in the second direction; and a control device. The second portion supports a tool for processing a work. The distance sensor measures a distance in the second direction to a reference surface of the work and outputs a distance signal indicating the distance when the distance sensor is located at each of a plurality of positions in the first direction. The control device generates measurement data indicating relationships between coordinates in the first direction of a plurality of points on the reference surface and distances from the plurality of points to the distance sensor based on the distance signal, determines a step coordinate range as a coordinate range in the first direction of a step formed on the reference surface based on the measurement data, generates control data indicating a locus of the tool based on the measurement data and the step coordinate range, and numerically controls the first servomotor and the second servomotor based on the control data. The locus includes a first locus portion of which coordinates in the first direction are not included in the step coordinate range and a second locus portion of which coordinates in the first direction are included in the step coordinate range. The control device calculates a portion of the control data, which corresponds to the first locus portion, based on a first offset value and calculates a portion of the control data, which corresponds to the second locus portion, based on a second offset value.

Preferably, the reference surface is a curved surface, the second direction is a direction of a moving radius, and the first direction is a rotational direction of the moving radius.

Preferably, the processing device further includes: a first work supporting portion configured to support the work; a second work supporting portion configured to support the work; and a base to which the first work supporting portion and the second work supporting portion are fixed. The first servomotor turns the first portion around a turn axis. The base is provided with a first positioning means group for positioning the first work supporting portion and a second positioning means group for positioning the second work supporting portion. The first positioning means group is arranged along a first radius of which a center is the turn axis. The second positioning means group is arranged along a second radius of which a center is the turn axis.

Preferably, the control data indicates a coordinate $\theta_k$ in the first direction of a point $U_k$ on the locus, a coordinate $T_k$ in the second direction of the point $U_k$, a coordinate $\theta_{k+1}$ in the first direction of a point $U_{k+1}$ on the locus, and a coordinate $T_{k+1}$ in the second direction of the point $U_{k+1}$. The control device controls the first servomotor and the second servomotor such that the tool passes through a point $U_x$ having a coordinate $\theta_x$ in the first direction between the coordinate $\theta_k$ and the coordinate $\theta_{k+1}$. A coordinate $T_x$ in the second direction of the point $U_x$ satisfies an equation:

$$T_x = T_k + [(\theta_x - \theta_k)/(\theta_{k+1} - \theta_k)] \cdot (T_{k+1} - T_k).$$

Preferably, the control device generates step determination data based on the measurement data and determines the step coordinate range based on the step determination data. With respect to a noted point as one of the plurality of points, the step determination data indicates a relationship between a coordinate in the first direction of the noted point and a difference between a distance in the second direction from the distance sensor to the noted point and a distance in the second direction from the distance sensor to a point next to the noted point among the plurality of points.

Preferably, the control device generates step determination data based on the measurement data and determines the step coordinate range based on the step determination data. With respect to a noted point as one of the plurality of points, the step determination data indicates a relationship between a coordinate in the first direction of the noted point and a radius of a circle passing through consecutive three points including the noted point among the plurality of points.

Preferably, the control device generates step determination data based on the measurement data and determines the step coordinate range based on the step determination data. With respect to a noted point as one of the plurality of points, the step determination data indicates a relationship between a coordinate in the first direction of the noted point and a distance between a predetermined point and a center of a circle passing through consecutive three points including the noted point among the plurality of points.

Preferably, the control device generates step determination data based on the measurement data and determines the step coordinate range based on the step determination data. With respect to a noted point as one of the plurality of points, the step determination data indicates a relationship between a coordinate in the first direction of the noted point and a radius of a circle passing through consecutive three points including the noted point among the plurality of points and indicates a relationship between the coordinate in the first direction of the noted point and a distance between a predetermined point and a center of the circle.

In a second aspect of the present invention, a processing method includes: a step of a distance sensor provided to a first portion driven in a first direction by a first servomotor measuring a distance to a reference surface of a work in a second direction orthogonal to the first direction to output a distance signal indicating the distance when the distance sensor is located at each of a plurality of positions in the first direction; a step of generating measurement data indicating relationships between coordinates in the first direction of a plurality of points on the reference surface and distances from the plurality of points to the distance sensor based on the distance signal; a step of determining a step coordinate range as a coordinate range in the first direction of a step formed on the reference surface based on the measurement data; a step of generating control data indicating a locus of a tool for processing the work based on the measurement data and the step coordinate range; and a step of numerically controlling the first servomotor and the second servomotor based on the control data. The tool is supported by a second portion. The second portion is supported by the first portion such that the second portion is movable in the second direction. The second portion is driven in the second direction by the second servomotor. The locus includes a first locus portion of which coordinates in the first direction are not included in the step coordinate range and a second locus portion of which coordinates in the first direction are included in the step coordinate range. The step of determining the step coordinate range includes: a step of calculating a portion of the control data, which corresponds to the first locus portion, based on a first offset value; and a step of calculating a portion of the control data, which corresponds to the second locus portion, based on a second offset value.

Preferably, the reference surface is a curved surface. The second direction is a direction of a moving radius. The first direction is a rotational direction of the moving radius.

Preferably, the first servomotor turns the first portion around a turn axis. The processing method further includes: a step of adjusting a position of a first work support portion for supporting the work in a direction of a first radius of which a center is the turn axis; and a step of adjusting a position of a second work support portion for supporting the work in a direction of a second radius of which a center is the turn axis.

Preferably, the control data indicates a coordinate $\theta_k$ in the first direction of a point $U_k$ on the locus, a coordinate $T_k$ in the second direction of the point $U_k$, a coordinate $\theta_{k+1}$ in the first direction of a point $U_{k+1}$ on the locus, and a coordinate $T_{k+1}$ in the second direction of the point $U_{k+1}$. The step of numerically controlling the first servomotor and the second servomotor includes a step of numerically controlling the first servomotor and the second servomotor such that the tool passes through a point $U_x$ having a coordinate $\theta_x$ in the first direction between the coordinate $\theta_k$ and the coordinate $\theta_{k+1}$. A coordinate $T_x$ in the second direction of the point $U_x$ satisfies an equation:

$$T_x = T_k + [(\theta_x - \theta_k)/(\theta_{k+1} - \theta_k)] \cdot (T_{k+1} - T_k).$$

Preferably, the step of determining the step coordinate range includes: a step of generating step determination data based on the measurement data; and a step of determining the step coordinate range based on the step determination data. With respect to a noted point as one of the plurality of points, the step determination data indicates a relationship between a coordinate in the first direction of the noted point and a difference between a distance in the second direction from the distance sensor to the noted point and a distance in the second direction from the distance sensor to a point next to the noted point among the plurality of points.

Preferably, the step of determining the step coordinate range includes: a step of generating step determination data based on the measurement data; and a step of determining the step coordinate range based on the step determination data. With respect to a noted point as one of the plurality of points, the step determination data indicates a relationship between a coordinate in the first direction of the noted point and a radius of a circle passing through consecutive three points including the noted point among the plurality of points.

Preferably, the step of determining the step coordinate range includes: a step of generating step determination data based on the measurement data; and a step of determining the step coordinate range based on the step determination data. With respect to a noted point as one of the plurality of points, the step determination data indicates a relationship between a coordinate in the first direction of the noted point and a distance between a predetermined point and a center of a circle passing through consecutive three points including the noted point among the plurality of points.

Preferably, the step of determining the step coordinate range includes: a step of generating step determination data based on the measurement data; and a step of determining the step coordinate range based on the step determination data. With respect to a noted point as one of the plurality of points, the step determination data indicates a relationship between a coordinate in the first direction of the noted point and a radius of a circle passing through consecutive three points including the noted point among the plurality of points and indicates a relationship between the coordinate in the first direction of the noted point and a distance between a predetermined point and a center of the circle.

According to the present invention, there are provided a processing device and a processing method capable of processing a work into a desired shape without requiring an exact alignment of the work.

BRIEF DESCRIPTION OF DRAWINGS

The above and other objects, advantages, and features of the present invention will be more apparent from the description of embodiments taken in conjunction with the accompanying drawings, in which:

FIG. 8 shows a data structure of the measurement data;

FIG. 9 shows a data structure of step determination data according to the first embodiment;

FIG. 11 shows a data structure of control data;

DESCRIPTION OF EMBODIMENTS

With reference to the accompanying drawings, embodiments of a processing device and a processing method according to the present invention will be described below.
(First Embodiment)

Figure 1:
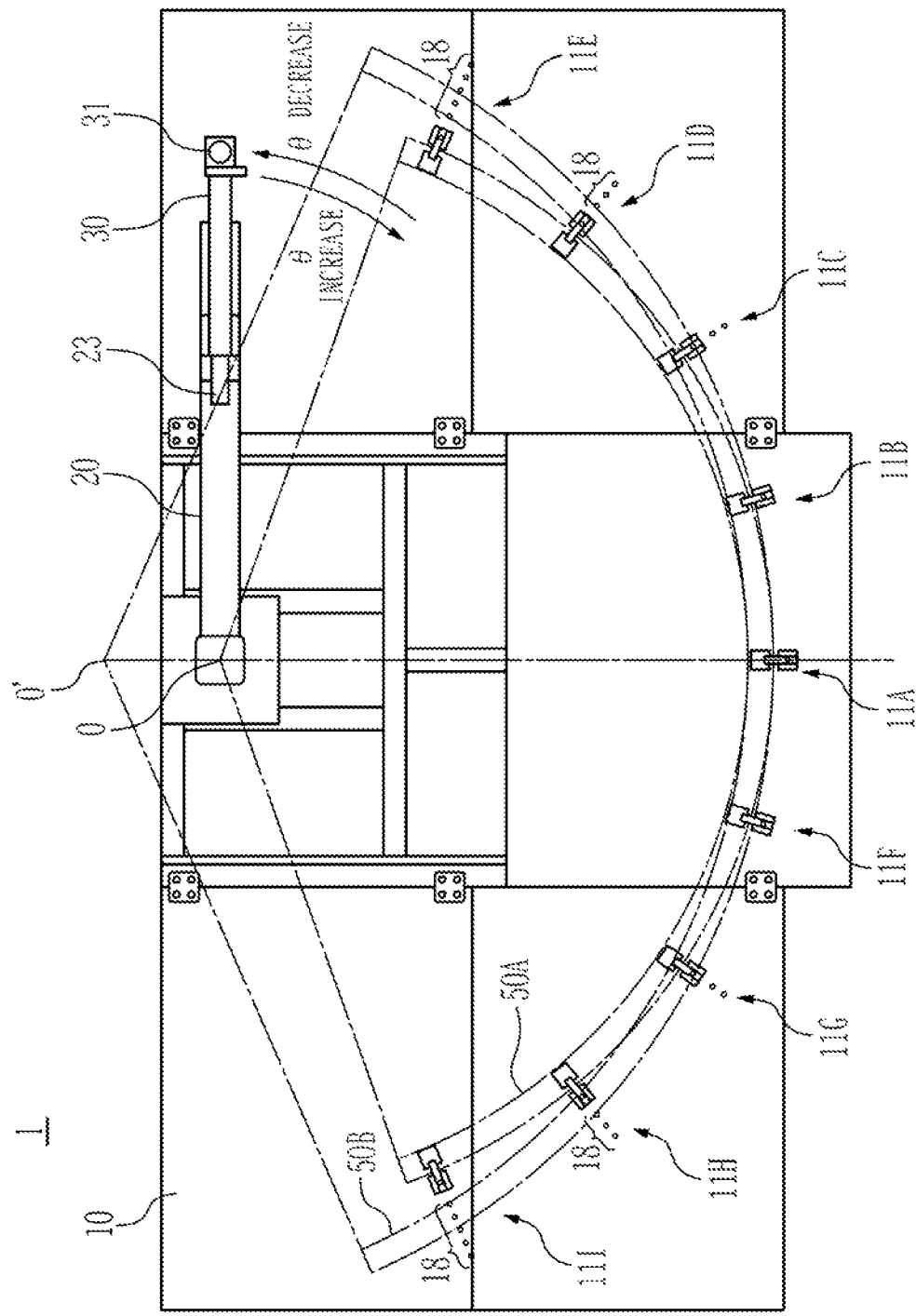
FIG. 1 is a top view of a processing device according to a first embodiment of the present invention.

As shown in FIG. 1, a processing device 1 according to a first embodiment of the present invention includes a base 10, work supporting portions 11A to 11I, a rotational direction movable body 20, a servomotor 23, a moving radius direction movable body 30, and a spindle 31. There is shown an origin O of a cylindrical coordinate system. A moving radius of the cylindrical coordinate system is fixed to the rotational direction movable body 20. The rotational direction movable body 20 turns around a Z axis of the cylindrical coordinate system as a turn axis. Thus, the rotational direction movable body 20 moves in a rotational direction of the moving radius. The rotational direction is orthogonal to a direction of the moving radius. The rotational direction movable body 20 turns in both directions of increasing and decreasing coordinate $\theta$ (argument $\theta$) in the moving radius rotational direction. The moving radius direction movable body 30 is supported by the rotational direction movable body 20 such that the moving radius direction movable body 30 is movable in the moving radius direction. The servomotor 23 drives the moving radius direction movable body 30 in the moving radius direction. The moving radius direction movable body 30 supports the spindle 31.

The work supporting portions 11A to 11I support a work 50A. The work 50A is substantially arc-shaped. The work supporting portions 11A to 11I are located and fixed to the base 10 such that the center of curvature of the work 50A is approximately coincident with the origin O. It is noted that, since the processing device 1 processes the work 50A based on a reference surface of the work 50A, an exact alignment of the work 50A is not required. The work supporting portions 11B to 11E are sequentially arranged in a counterclockwise direction (i.e., in a direction of decreasing the coordinate $\theta$) from the work supporting portion 11A, and the work supporting portions 11F to 11I are sequentially arranged in a clockwise direction (i.e., in a direction of increasing the coordinate $\theta$) from the work supporting portion 11A. The positions of the work supporting portions 11B to 11I can be respectively changed along the radial directions of which a center is the Z axis. A group of positioning means, 18 is provided on the base 10 correspondingly to each of the work supporting portions 11B to 11I. The positioning means groups 18 are arranged along radial directions of which a center is the Z axis. The positioning means group 18 is, for example, a group of holes formed in the base 10 and each of the holes is formed with an internal thread. Each of the work supporting portions 11B to 11I is positioned by a bolt that engages arbitrary one of the holes included in the corresponding positioning means group 18. As farther away from the work supporting portion 11A, the work supporting portions 11B to 11I can be positioned in a wider range in the radial direction. Therefore, the work supporting portions 11A to 11I can support also a work 50B having a larger radius of curvature than that of the work 50A. In this case, the center of curvature of the work 50B is arranged to be approximately coincident with a fixed point O' on the cylindrical coordinate system. An exact alignment is not required also for the work 50B. For example, the point O' is arranged on a straight line passing through the origin O and the work supporting portion 11A such that the origin O is arranged between the point O' and the work supporting portion 11A. Thus, the processing device 1 can process works of various radii of curvature.

Figure 2:
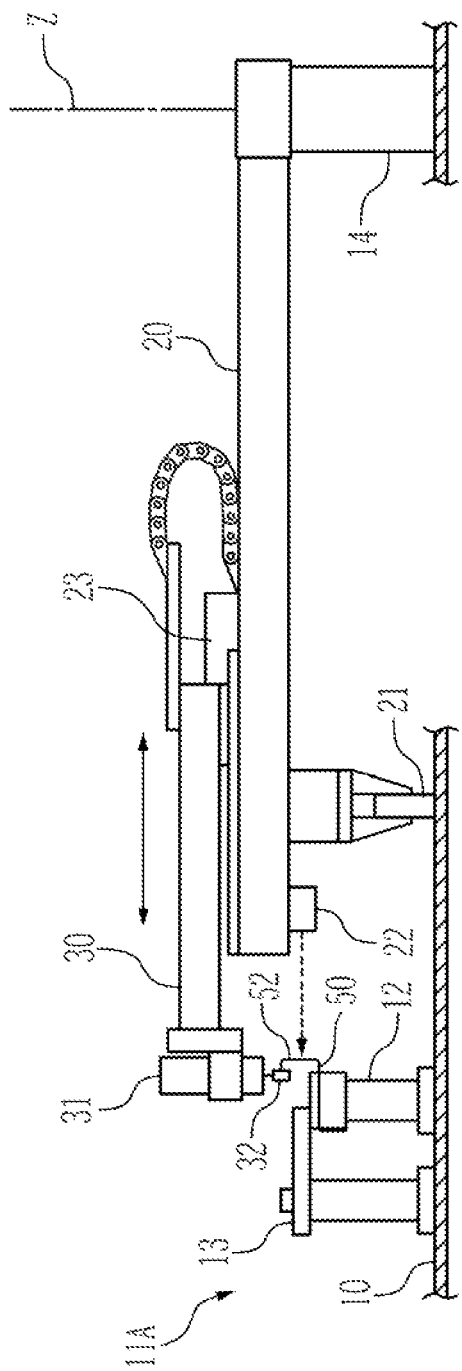
FIG. 2 is a side view of the processing device according to the first embodiment.

Referring to FIG. 2, the processing device 1 includes a servomotor 14, a wheel 21, a distance sensor 22 and a tool 32. The servomotor 14 drives the rotational direction movable body 20 in the moving radius rotational direction. That is, the servomotor 14 turns the rotational direction movable body 20 around the Z axis. The rotational direction movable body 20 extends in the moving radius direction from the Z axis passing through the origin O. The wheel 21 and the distance sensor 22 are provided in the vicinity of an end of the rotational direction movable body 20, which is farther from the Z axis. The wheel 21 runs on the base 10 in accordance with the turn of the rotational direction movable body 20 around the Z axis. The spindle 31 is attached to the moving radius direction movable body 30 such that the position of the spindle 31 is adjustable along the Z axis. The tool 32 is attached to the spindle 31. That is, the tool 32 is supported by the moving radius direction movable body 30. The work 50A and the work 50B are represented by a work 50. The work supporting portion 11A includes a lower side supporting portion 12 arranged at a lower side of the work 50 and an upper side supporting portion 13 arranged at an upper side of the work 50. The lower side supporting portion 12 and the upper side supporting portion 13 fasten the work 50. Similarly to the work supporting portion 11A, each of the work supporting portions 11B to 11I includes a lower side supporting portion 12 and an upper side supporting portion 13.

Figure 3:
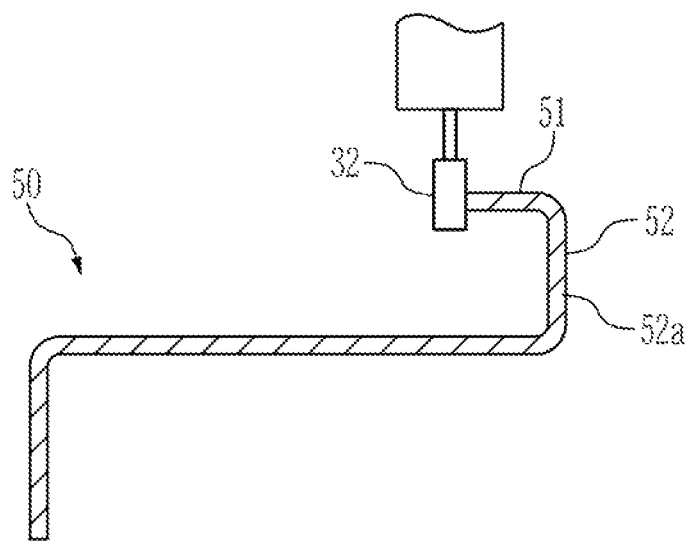
FIG. 3 is a sectional view of a work.

Referring to FIG. 3, the work 50 includes a lip flange 52. A lip flange surface 52a of the lip flange 52 is a curved surface. When the work 50 is the work 50A, the center of curvature of the lip flange surface 52a is approximately coincident with the origin O, and when the work 50 is the work 50B, the center of curvature of the lip flange surface 52a is approximately coincident with the point O'. The distance sensor 22 measures a distance in the moving radius direction to the lip flange surface 52a as a reference surface for processing. The tool 32 processes a lip portion 51 of the lip flange 52. The servomotor 14 and the servomotor 23 control the position of the tool 32 based on the measurement result of the distance such that the lip portion 51 is processed to have a desired dimensions. The processing device 1 performs a trimming of the lip portion 51.

Figure 4:
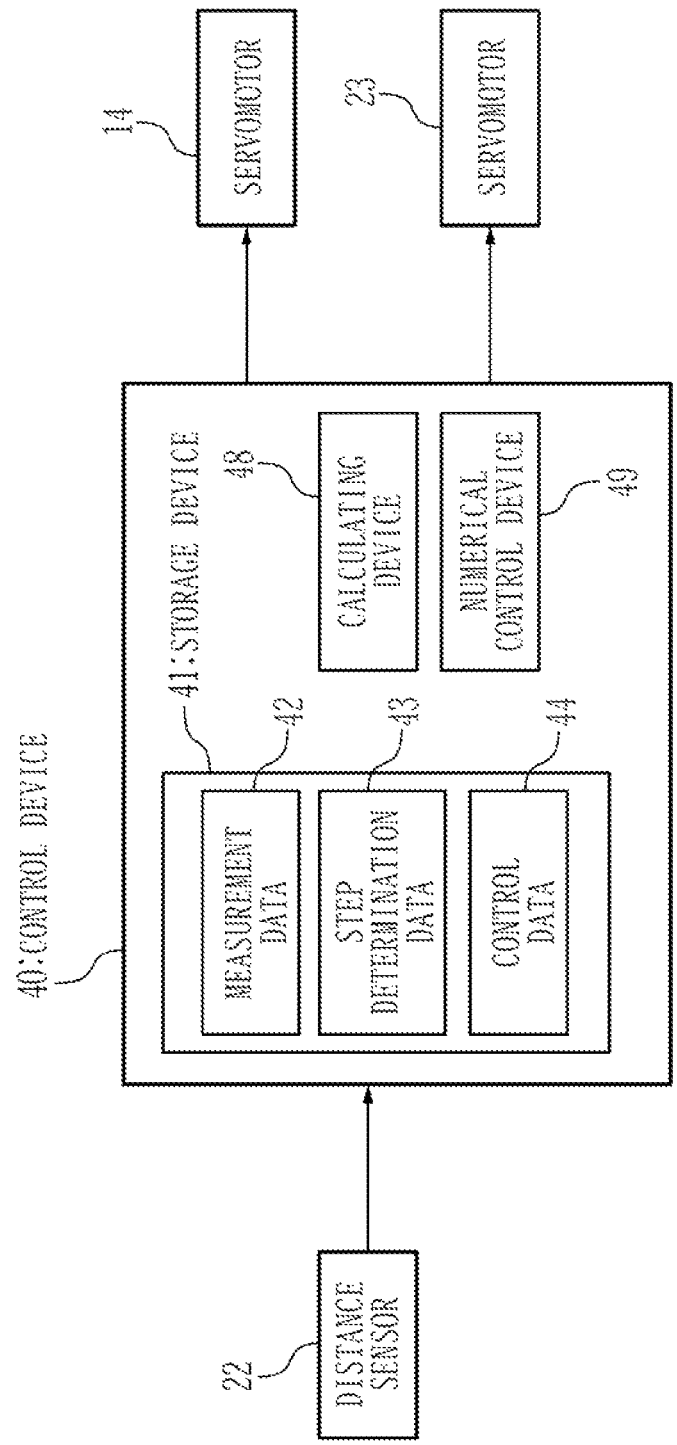
FIG. 4 is a block diagram of a control system of the processing device according to the first embodiment.

Referring to FIG. 4, a control system of the processing device 1 is described. The processing device 1 includes a control device 40. The control device 40 includes a storage device 41, a calculating device 48 and a numerical control device 49. The distance sensor 22 outputs a distance signal indicating a distance to the lip flange surface 52a to the control device 40. The calculating device 48 generates measurement data 42 based on the distance signal. The calculating device 48 generates step determination data 43 based on the measurement data 42. The calculating device 48 generates control data 44 based on the measurement data 42 and the step determination data 43. The storage device 41 stores the measurement data 42, the step determination data 43 and the control data 44. The numerical control device 49 numerically controls the servomotor 14 and the servomotors 23 based on the control data 44.

Hereinafter, a processing method using the processing device 1 is described. The processing method includes a step of setting the work 50, a step of generating the measurement data 42, a step of determining a step coordinate range as a coordinate range in the moving radius rotational direction of a step formed on the lip flange surface 52a, a step of generating the control data 44, and a step of processing the work 50.

First, the step of setting the work 50 is described. The positions of the work supporting portions 11B to 11I in the radial directions are adjusted in accordance with a shape of the work 50 to be processed. After finishing the adjustment, the work 50 is set to the work supporting portions 11A to 11I.

Figure 5:
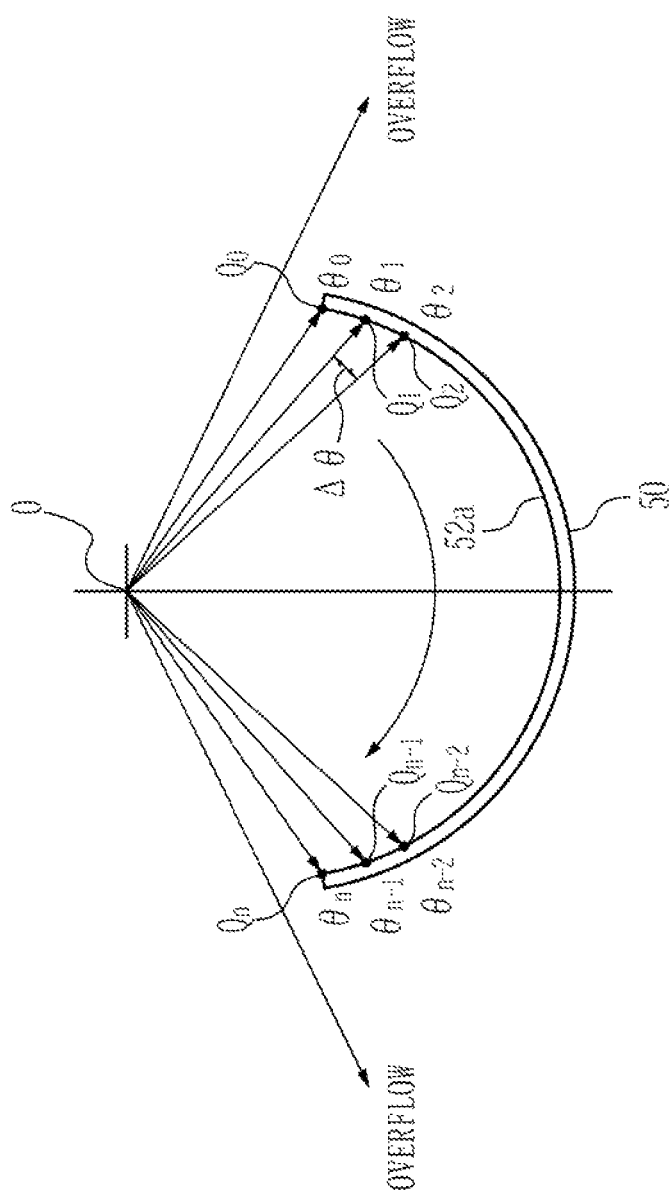
FIG. 5 is an explanatory diagram for explaining a step of generating measurement data.

Referring to FIG. 5, the step of generating the measurement data 42 is described. The numerical control device 49 numerically controls the servomotor 14 such that the rotational direction movable body 20 turns at a constant circumferential speed in a clockwise direction. During the turn of the rotational direction movable body 20, the distance sensor 22 emits a laser beam in the moving radius direction and outputs a distance signal based on the reflected light of the laser beam to the control device 40. Immediately after the start of the turn of the rotational direction movable body 20, a value indicated by the distance signal overflows. After a short time from the start of the turn, the laser beam becomes to be reflected by the lip flange surface 52a, and thus, the value indicated by the distance signal becomes to not overflow. The control device 40 obtains the first value after the value indicated by the distance signal becomes to not overflow, in association with a coordinate $\theta_0$ at that time. Thereafter, the control device 40 obtains the value indicated by the distance signal every time the coordinate $\theta$ increases by $\Delta\theta$, in association with the coordinate $\theta$ at that time, until the value indicated by the distance signal overflows again. It is noted that a contact type distance sensor may be used in place of the distance sensor 22.

Figure 6:
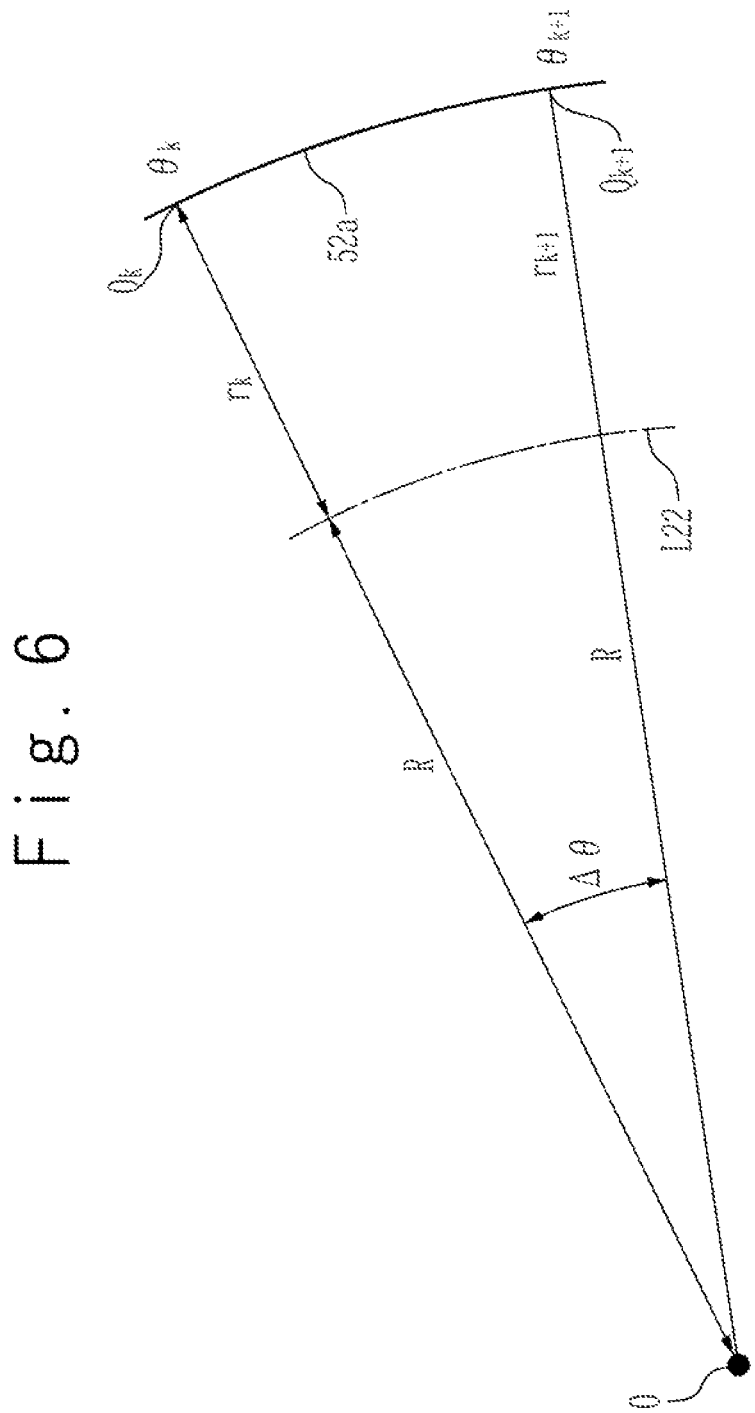
FIG. 6 is an explanatory diagram for explaining the step of generating the measurement data.

Referring to FIG. 6, when the rotational direction movable body 20 turns, the distance sensor 22 moves along a locus L22. The locus L22 is a circle of a radius R with the origin O (or Z axis) as a center thereof. When the moving radius rotational direction position of the distance sensor 22 is a coordinate $\theta_k$, the distance sensor 22 measures a distance $r_k$ in the moving radius direction from the distance sensor 22 to a point $Q_k$ on the lip flange surface 52a and outputs the distance signal indicating the distance $r_k$ to the control device 40. When the moving radius rotational direction position of the distance sensor 22 is a coordinate $\theta_{k+1}$, the distance sensor 22 measures a distance $r_{k+1}$ in the moving radius direction from the distance sensor 22 to a point $Q_{k+1}$ on the lip flange surface 52a and outputs the distance signal indicating the distance $r_{k+1}$ to the control device 40. The coordinate of the point $Q_k$ in the moving radius rotational direction is $\theta_k$ and the coordinate of the point $Q_{k+1}$ in the moving radius rotational direction is $\theta_{k+1}$. In this way, when the distance sensor 22 is located at positions $\theta_0$ to $\theta_n$ in the moving radius rotational direction, the distance sensor 22 respectively measures distances $r_0$ to $r_n$ in the moving radius direction to the points $Q_0$ to $Q_n$ on the lip flange surface 52a and outputs the distance signal indicating the distances $r_0$ to $r_n$ to the control device 40. Here, the coordinates of the points $Q_0$ to $Q_n$ in the moving radius rotational direction are $\theta_0$ to $\theta_n$. The calculating device 48 generates the measurement data 42 indicating relationships between the coordinates $\theta_0$ to $\theta_n$ in the moving radius rotational direction of the plurality of points $Q_0$ to $Q_n$ and the distances $r_0$ to $r_n$. The storage device 41 stores the measurement data 42.

Figure 7:
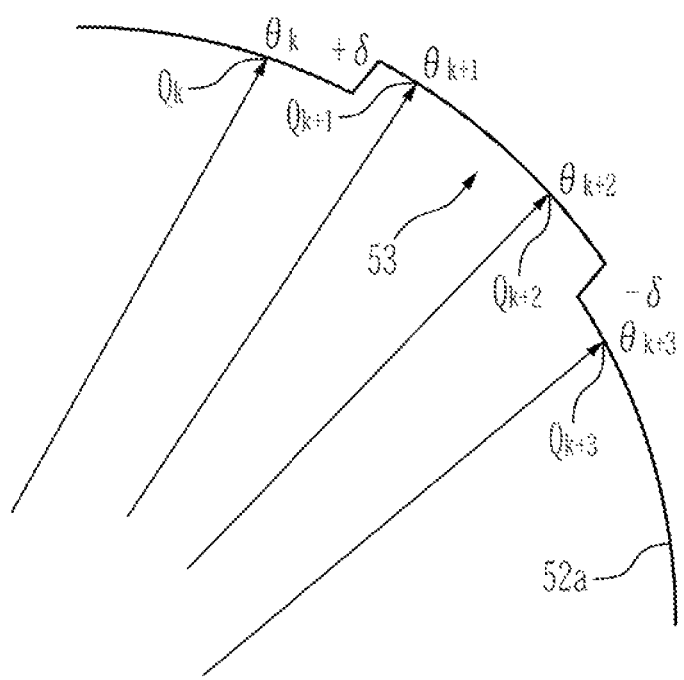
FIG. 7 is an explanatory diagram for explaining the step of generating the measurement data.

Referring to FIG. 7, a step 53 is formed on the lip flange surface 52a. The step 53 is a minute step that is formed by, e.g., chemical milling. The step 53 is exaggeratedly shown in the figure. The points $Q_{k+1}$ and $Q_{k+2}$ are arranged on the step 53. The points $Q_k$ and $Q_{k+3}$ are arranged on portions of the lip flange surface 52a other than the step 53. The distance $r_{k+1}$ in the moving radius rotational direction from the distance sensor 22 to the point $Q_{k+1}$ is different from the distance $r_k$ in the moving radius rotational direction from the distance sensor 22 to the point $Q_k$ by $+\delta$. The distance $r_{k+2}$ in the moving radius rotational direction from the distance sensor 22 to the point $Q_{k+2}$ is almost equal to the distance $r_{k+1}$ in the moving radius rotational direction from the distance sensor 22 to the point $Q_{k+1}$. The distance $r_{k+3}$ in the moving radius rotational direction from the distance sensor 22 to the point $Q_{k+3}$ is different from the distance $r_{k+2}$ in the moving radius rotational direction from the distance sensor 22 to the point $Q_{k+2}$ by $-\delta$.

FIG. 8 shows a data structure of the measurement data 42.

Next, the step of determining a step coordinate range as a coordinate range in the moving radius rotational direction of the step 53 is described. The calculating device 48 determines the step coordinate range as the coordinate range in the moving radius rotational direction of the step 53 based on the measurement data 42. For example, the calculating device 48 generates the step determination data 43 based on the measurement data 42 and determines the step coordinate range based on the step determination data 43.

Referring to FIG. 9, the step determination data 43 is described. The step determination data 43 indicates a relationship between a distance difference $\Delta r$ and a coordinate $\theta$ of the point Q with regard to each of the points $Q_0$ to $Q_{n-1}$. Here, the distance difference $\Delta r_k$ is a difference between the distance $r_k$ in the moving radius direction from the distance sensor 22 to the point $Q_k$ and the distance $r_{k+1}$ in the moving radius direction from the distance sensor 22 to the point $Q_{k+1}$. The point $Q_{k+1}$ is a point next to the point $Q_k$.

Figure 10:
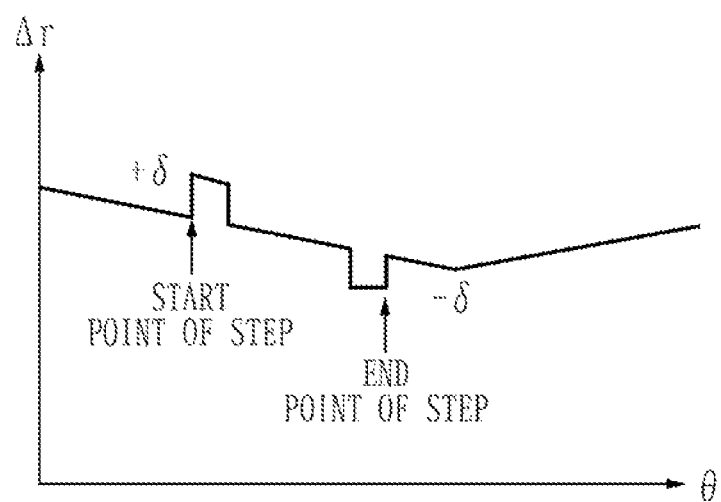
FIG. 10 is a graph of the step determination data according to the first embodiment.

FIG. 10 is a graph of the step determination data 43. In FIG. 10, the vertical axis indicates the distance difference $\Delta r$ and the horizontal axis indicates the coordinate $\theta$. As apparent from FIG. 10, even when $\delta$ is very small, a start point and an end point of the step 53 can be easily detected. Therefore, it is easy to determine a step coordinate range based on the step determination data 43. The calculating device 48 determines a step coordinate range $\theta_{k+1}$ to $\theta_{k+2}$ based on the step determination data 43.

Referring to FIG. 11, the step of generating the control data 44 is described. The calculating device 48 generates the control data 44 based on the measurement data 42 and the step coordinate range $\theta_{k+1}$ to $\theta_{k+2}$. The control data 44 indicates a locus of the tool 32. The locus of the tool 32 is indicated by a combination of the coordinate $\theta$ in the moving radius rotational direction and a coordinate T in the moving radius direction of the tool 32.

Since the coordinates $\theta_0$ to $\theta_k$ and $\theta_{k+3}$ to $\theta_n$ in the moving radius rotational direction are not included in the step coordinate range $\theta_{k+1}$ to $\theta_{k+2}$, the calculating device 48 calculates the coordinates $T_0$ to $T_k$ corresponding to the coordinates $\theta_0$ to $\theta_k$ and the coordinates $T_{k+3}$ to $T_n$ corresponding to the coordinates $\theta_{k+3}$ to $\theta_n$ based on an equation:

$$T=R+r+D1.$$

Here, R is a radius of the locus L22, r is a moving radius direction distance from the distance sensor 22 to the lip flange surface 52a, and D1 is a predetermined offset value. The offset value D1 is a sum of a target width P of the lip portion 51 and a radius S of the tool 32. For example, the moving radius direction coordinate $T_k$ corresponding to the coordinate $\theta_k$ in the moving radius rotational direction is given by an equation:

$$T_k=R+r_k+D1=R+r_k+P+S.$$

Since the coordinates $\theta_{k+1}$ and $\theta_{k+2}$ in the moving radius rotational direction are included in the step coordinate range $\theta_{k+1}$ to $\theta_{k+2}$, the calculating device 48 calculates the coordinate $T_{k+1}$ corresponding to the coordinate $\theta_{k+1}$ and the coordinate $T_{k+2}$ corresponding to the coordinate $\theta_{k+2}$ based on an equation:

$$T=R+r+D2.$$

Here, D2 is an offset value different from D1. The offset value D2 is equal to a value obtained by subtracting a correction value $\epsilon$ corresponding to the step 53 from the sum of the target width P of the lip portion 51 and the radius S of the tool 32. The correction value $\epsilon$ is a predetermined value or a calculation value. For example, the calculating device 48 calculates the increment $\delta$ of the distance difference $\Delta r$ at the start point or the end point of the step 53 based on the step determination data 43 and calculates the correction value $\epsilon$ as a calculation value based on the increment $\delta$ of the distance difference $\Delta r$. For example, the moving radius direction coordinate $T_{k+1}$ corresponding to the coordinate $\theta_{k+1}$ in the moving radius rotational direction is given by an equation:

$$T_{k+1}=R+r_{k+1}+D2=R+r_{k+1}+P+S-\epsilon.$$

Figure 12:
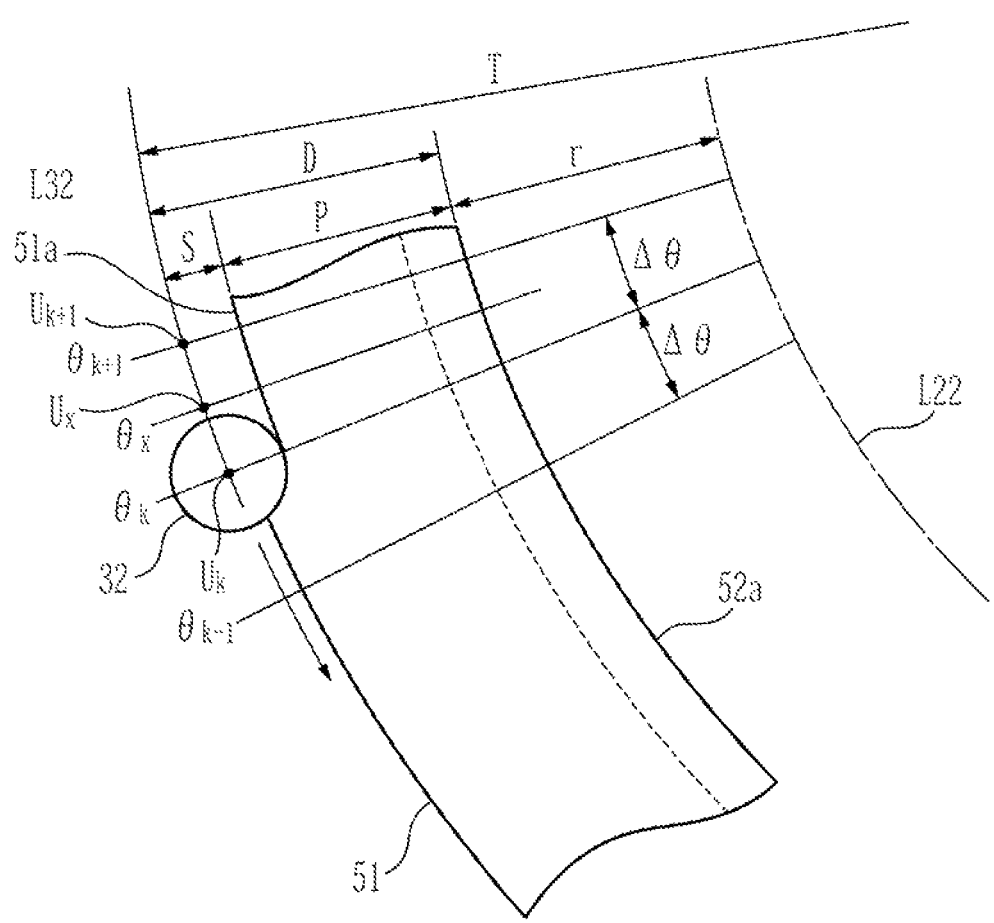
FIG. 12 is an explanatory diagram for explaining a step of processing the work.

FIG. 12 shows relationships among the coordinate T, the distance r, the offset value D, the target width P and the radius S.

Referring to FIG. 12, the step of processing the work 50 is described. The numerical control device 49 numerically controls the servomotor 14 and the servomotor 23 based on the control data 44 to move the tool 32 along a locus L32 indicated by the control data 44. The control data 44 indicates coordinates $(\theta_k, T_k)$, $(\theta_{k+1}, T_{k+1})$ and the like of points $U_k$, $U_{k+1}$ and the like on the locus L32. In this way, the trimming of the lip portion 51 is performed. Since first locus portions (a portion of which the coordinate in the moving radius rotational direction is from $\theta_0$ to $\theta_k$ and a portion of which the coordinate in the moving radius rotational direction is from $\theta_{k+3}$ to $\theta_n$) of the locus L32, of which coordinates in the moving radius rotational direction are not included in the step coordinate range $\theta_{k+1}$ to $\theta_{k+2}$, are calculated with using the offset value D1 and a second locus portion (a portion of which the coordinate in the moving radius rotational direction is from $\theta_{k+1}$ to $\theta_{k+2}$) of the locus L32, of which coordinates in the moving radius rotational direction are included in the step coordinate range $\theta_{k+1}$ to $\theta_{k+2}$, is calculated with using the offset value D2, it is prevented that the shape of the step 53 is reflected on a contour line 51a of the lip portion 51, which is formed by the tool 32.

At this time, the numerical control device 49 controls the servomotor 14 such that the tool 32 moves in the counterclockwise direction. Since the turn direction of the rotational direction movable body 20 at the time of generating the measurement data 42 and the turn direction of the rotational direction movable body 20 at the time of processing the work 50 are reverse to each other, man-hours can be reduced.

Moreover, the numerical control device 49 numerically controls the servomotor 14 and the servomotor 23 such that the tool 32 passes through a point $U_x$ having a coordinate $\theta_x$ in the moving radius rotational direction between the coordinates $\theta_k$ and $\theta_{k+1}$. The control data 44 does not indicate the coordinate $(\theta_x, T_x)$. The coordinate $T_x$ in the moving radius direction of the point $U_x$ satisfies an equation:

$$T_x=T_k+[(\theta_x-\theta_k)/(\theta_{k+1}-\theta_k)]\cdot(T_{k+1}-T_k).$$

Since a linear interpolation control like this is performed, the contour line 51a is formed to be smooth.

In the above description, the step 53 is a single step and the magnitude of the increment of the distance difference $\Delta r$ at the start point of the step 53 is equal to the magnitude of the increment of the distance difference $\Delta r$ at the end point of the step 35. The processing device 1 is applicable in a case that the step 53 includes a plurality of steps and also in a case that the magnitude of the increment of the distance difference $\Delta r$ at the start point of the step 53 is different from the magnitude of the increment of the distance difference $\Delta r$ at the end point of the step 35.

(Second Embodiment)

A processing method according to a second embodiment of the present invention is the same as the processing method according to the first embodiment except the step of determining the step coordinate range.

Figures 13, 14:
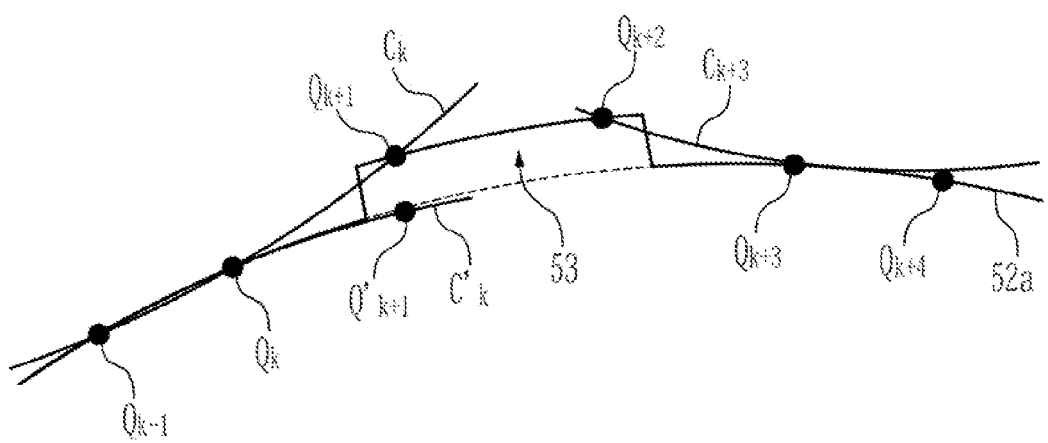
FIG. 13 is an explanatory diagram for explaining a method of determining a step coordinate range according to a second embodiment of the present invention.
FIG. 14 shows a data structure of step determination data according to the second embodiment.

Referring to FIG. 13, the step of determining the step coordinate range according to the present embodiment is described. Points $Q_{k-1}$, $Q_k$, $Q_{k+3}$ and $Q_{k+4}$ are arranged on portions of the lip flange surface 52a other than the step 53. Points $Q_{k+1}$ and $Q_{k+2}$ are arranged on the step 53. When the step 53 is not formed on the lip flange surface 52a, a distance in the moving radius direction from the distance sensor 22 to a hypothetical point $Q'_{k+1}$ is measured in place of measuring the distance in the moving radius direction from the distance sensor 22 to the point $Q_{k+1}$. A distance $V'_k$ between a center of a circle $C'_k$ passing through the three points $Q_{k-1}$, $Q_k$, and $Q'_{k+1}$ and the origin O or the point O' is small, and a radius $W'_k$ of the circle $C'_k$ is approximately equal to the radius of curvature of the lip flange surface 52a. On the other hand, a distance $V_k$ between a center of a circle $C_k$ passing through the consecutive three points $Q_{k-1}$ to $Q_{k+1}$ including the point $Q_{k+1}$ arranged on the step 53 and the origin O or the point O' is large, and a radius $W_k$ of the circle $C_k$ is much smaller than the radius of curvature of the lip flange surface 52a. Similarly, a distance $V_{k+3}$ between a center of a circle $C_{k+3}$ passing through the consecutive three points $Q_{k+2}$ to $Q_{k+4}$ including the point $Q_{k+2}$ arranged on the step 53 and the origin O or the point O' is large, and a radius $W_{k+3}$ of the circle $C_{k+3}$ is much smaller than the radius of curvature of the lip flange surface 52a.

FIG. 14 shows step determination data 43' that is generated by the calculating device 48 based on the measurement data 42. The step determination data 43' indicates, for each of the points $Q_1$ to $Q_{n-1}$, relationships among a coordinate θ of the point Q; a distance V between a center of a circle C passing through consecutive three points including the point Q and the origin O or the point O'; and a radius W of the circle C. For example, the distance $V_k$ is the distance between the center of the circle $C_k$ passing through the consecutive three points $Q_{k-1}$ to $Q_{k+1}$ including the point $Q_k$ and the origin O or the point O'. The radius $W_k$ is the radius of the circle $C_k$. The calculating device 48 is capable of determining the step coordinate range $\theta_{k+1}$ to $\theta_{k+2}$ based on the step determination data 43'. Although it is possible to determine the step coordinate range based on only the radius of the circle passing through the consecutive three points or based on only the distance between the center of the circle passing through the consecutive three points and the predetermined point O or O', it is preferable to determine the step coordinate range based on both of the radius of the circle and the distance between the center of the circle and the predetermined point.

In the first and second embodiments, the explanation has been given to the case that the shape of the lip flange surface 52a is grasped based on a plane polar coordinate system and the tool 32 is moved based on the plane polar coordinate system. The processing based on such a plane polar coordinate system is preferable in a case that the lip flange surface 52a is a curved surface. Meanwhile, in a case that the radius of curvature of the lip flange surface 52a is very large (for example, in a case that the work 50 is straight-line shaped), it is preferable to grasp the shape of the lip flange surface 52a based on a XY coordinate system and the tool 32 is moved based on the XY coordinate system. In this case, the servomotor 14 drives the rotational direction movable body 20 in the X direction, the servomotor 23 drives the moving radius direction movable body 30 in the Y direction with respect to the rotational direction movable body 20, and the distance sensor 22 measures a distance in the Y direction.

In addition, the processing method according to the first and second embodiments is also applicable to various machining processes other than trimming.

The present invention has been described with reference to the embodiments; however, the present invention is not limited to the above embodiments. Various modifications can be applied to the above embodiments.

This application is based upon and claims the benefit of priority from Japanese Patent Application No. 2009-045253, filed on Feb. 27, 2009, the disclosure of which is incorporated herein in its entirely by reference.

The invention claimed is:

1. A processing device comprising:
   a first portion;
   a first servomotor configured to drive said first portion in a first direction;
   a distance sensor provided to said first portion;
   a second portion supported by said first portion such that said second portion is movable in a second direction orthogonal to said first direction;
   a second servomotor configured to drive said second portion in said second direction; and
   a control device,
   wherein said second portion supports a tool for processing a work,
   said distance sensor measures a distance in said second direction to a reference surface of said work and outputs a distance signal indicating said distance when said distance sensor is located at each of a plurality of positions in said first direction,
   said control device generates measurement data indicating relationships between coordinates in said first direction of a plurality of points on said reference surface and distances from said plurality of points to said distance sensor based on said distance signal, determines a step coordinate range as a coordinate range in said first direction of a step formed on said reference surface based on said measurement data, generates control data indicating a locus of said tool based on said measurement data and said step coordinate range, and numerically controls said first servomotor and said second servomotor based on said control data,
   said locus includes a first locus portion of which coordinates in said first direction are not included in said step coordinate range and a second locus portion of which coordinates in said first direction are included in said step coordinate range, and
   said control device calculates a portion of said control data, which corresponds to said first locus portion, based on a first offset value and calculates a portion of said control data, which corresponds to said second locus portion, based on a second offset value.

2. The processing device according to claim 1, wherein said reference surface is a curved surface,
   said second direction is a direction of a moving radius, and
   said first direction is a rotational direction of said moving radius.

3. The processing device according to claim 2, further comprising:
   a first work supporting portion configured to support said work;
   a second work supporting portion configured to support said work; and
   a base to which said first work supporting portion and said second work supporting portion are fixed,
   wherein said first servomotor turns said first portion around a turn axis,
   said base is provided with a first positioning means group for positioning said first work supporting portion and a second positioning means group for positioning said second work supporting portion,
   said first positioning means group is arranged along a first radius of which a center is said turn axis, and
   said second positioning means group is arranged along a second radius of which a center is said turn axis.

4. The processing device according to claim 1, wherein said control data indicates a coordinate $\theta_k$ in said first direction of a point $U_k$ on said locus, a coordinate $T_k$ in said second direction of said point $U_k$, a coordinate $\theta_{k+1}$ in said first direction of a point $U_{k+1}$ on said locus, and a coordinate $T_{k+1}$ in said second direction of said point $U_{k+1}$,
   said control device controls said first servomotor and said second servomotor such that said tool passes through a point $U_x$ having a coordinate $\theta_x$ in said first direction between said coordinate $\theta_k$ and said coordinate $\theta_{k+1}$, and a coordinate $T_x$ in said second direction of said point $U_x$ satisfies an equation:

$$T_x = T_k + [(\theta_x - \theta_k)/(\theta_{k+1} - \theta_k)] \cdot (T_{k+1} - T_k).$$

5. The processing device according to of claim 1, wherein said control device generates step determination data based on said measurement data and determines said step coordinate range based on said step determination data, and with respect to a noted point as one of said plurality of points, said step determination data indicates a relationship between a coordinate in said first direction of said noted point and a difference between a distance in said second direction from said distance sensor to said noted point and a distance in said second direction from said distance sensor to a point next to said noted point among said plurality of points.

6. The processing device according to claim 1, wherein said control device generates step determination data based on said measurement data and determines said step coordinate range based on said step determination data, and with respect to a noted point as one of said plurality of points, said step determination data indicates a relationship between a coordinate in said first direction of said noted point and a radius of a circle passing through consecutive three points including said noted point among said plurality of points.

7. The processing device according to claim 1, wherein said control device generates step determination data based on said measurement data and determines said step coordinate range based on said step determination data, and with respect to a noted point as one of said plurality of points, said step determination data indicates a relationship between a coordinate in said first direction of said noted point and a distance between a predetermined point and a center of a circle passing through consecutive three points including said noted point among said plurality of points.

8. The processing device according to claim 1, wherein said control device generates step determination data based on said measurement data and determines said step coordinate range based on said step determination data, and with respect to a noted point as one of said plurality of points, said step determination data indicates a relationship between a coordinate in said first direction of said noted point and a radius of a circle passing through consecutive three points including said noted point among said plurality of points and indicates a relationship between said coordinate in said first direction of said noted point and a distance between a predetermined point and a center of said circle.

9. A processing method comprising:

a distance sensor provided to a first portion driven in a first direction by a first servomotor measuring a distance to a reference surface of a work in a second direction orthogonal to said first direction to output a distance signal indicating said distance when said distance sensor is located at each of a plurality of positions in said first direction;

generating measurement data indicating relationships between coordinates in said first direction of a plurality of points on said reference surface and distances from said plurality of points to said distance sensor based on said distance signal;

determining a step coordinate range as a coordinate range in said first direction of a step formed on said reference surface based on said measurement data;

generating control data indicating a locus of a tool for processing said work based on said measurement data and said step coordinate range; and numerically controlling said first servomotor and said second servomotor based on said control data, wherein said tool is supported by a second portion, said second portion is supported by said first portion such that said second portion is movable in said second direction, said second portion is driven in said second direction by said second servomotor, said locus includes a first locus portion of which coordinates in said first direction are not included in said step coordinate range and a second locus portion of which coordinates in said first direction are included in said step coordinate range, and said generating said control data includes:

calculating a portion of said control data, which corresponds to said first locus portion, based on a first offset value; and calculating a portion of said control data, which corresponds to said second locus portion, based on a second offset value.

10. The processing method according to claim 9, wherein said reference surface is a curved surface, said second direction is a direction of a moving radius, and said first direction is a rotational direction of said moving radius.

11. The processing method according to claim 10, wherein said first servomotor turns said first portion around a turn axis, the processing method further comprising:

adjusting a position of a first work support portion for supporting said work in a direction of a first radius of which a center is said turn axis; and adjusting a position of a second work support portion for supporting said work in a direction of a second radius of which a center is said turn axis.

12. The processing method according to claim 9, wherein said control data indicates a coordinate $\theta_k$ in said first direction of a point $U_k$ on said locus, a coordinate $T_k$ in said second direction of said point $U_k$, a coordinate $\theta_{k+1}$ in said first direction of a point $U_{k+1}$ on said locus, and a coordinate $T_{k+1}$ in said second direction of said point $U_{k+1}$, said numerically controlling said first servomotor and said second servomotor includes numerically controlling said first servomotor and said second servomotor such that said tool passes through a point $U_x$ having a coordinate $\theta_x$ in said first direction between said coordinate $\theta_k$ and said coordinate $\theta_{k+1}$, and a coordinate $T_x$ in said second direction of said point $U_x$ satisfies an equation:

$$T_x = T_k + [(\theta_x - \theta_k)/(\theta_{k+1} - \theta_k)] \cdot (T_{k+1} - T_k).$$

13. The processing method according to claim 9, wherein said determining said step coordinate range includes:

generating step determination data based on said measurement data; and determining said step coordinate range based on said step determination data, and with respect to a noted point as one of said plurality of points, said step determination data indicates a relationship between a coordinate in said first direction of said noted point and a difference between a distance in said second direction from said distance sensor to said noted point and a distance in said second direction from said distance sensor to a point next to said noted point among said plurality of points.

14. The processing method according to claim 9, wherein said determining said step coordinate range includes:

generating step determination data based on said measurement data; and determining said step coordinate range based on said step determination data, and with respect to a noted point as one of said plurality of points, said step determination data indicates a relationship between a coordinate in said first direction of said noted point and a radius of a circle passing through consecutive three points including said noted point among said plurality of points.

15. The processing method according to claim 9, wherein said determining said step coordinate range includes:

generating step determination data based on said measurement data; and determining said step coordinate range based on said step determination data, and with respect to a noted point as one of said plurality of points, said step determination data indicates a relationship between a coordinate in said first direction of said noted point and a distance between a predetermined point and a center of a circle passing through consecutive three points including said noted point among said plurality of points.

16. The processing method according to claim 9, wherein said determining said step coordinate range includes:

generating step determination data based on said measurement data; and determining said step coordinate range based on said step determination data, and with respect to a noted point as one of said plurality of points, said step determination data indicates a relationship between a coordinate in said first direction of said noted point and a radius of a circle passing through consecutive three points including said noted point among said plurality of points and indicates a relationship between said coordinate in said first direction of said noted point and a distance between a predetermined point and a center of said circle.

* * * * *